3,207,718
Patented Sept. 21, 1965

3,207,718
EPOXY MODIFIED VINYL COPOLYMERS OF α,β-UNSATURATED DICARBOXYLIC ACID PARTIAL ESTERS
Robert L. Zimmerman and Lieng-Huang Lee, Midland, Mich., assignors to The Dow Chemical Company, Midland, Mich., a corporation of Delaware
No Drawing. Filed Mar. 23, 1961, Ser. No. 97,729
18 Claims. (Cl. 260—29.6)

The present invention relates to polymer compositions and is more particularly concerned with compatible thermosetting compositions of homogeneous copolymers of vinyl aromatic compounds and α,β-unsaturated dicarboxylic acid partial esters and epoxy compounds.

We have found that hard, tough, glossy and adherent continuous coatings and laminates having excellent stain, detergent and solvent resistance are obtained from compositions comprising (A) a homogeneous copolymer of (1) from 70 to 98, preferably 72 to 96, mole percent of a vinyl aromatic compound and (2) correspondingly, from 30 to 2, preferably 20 to 4, mole percent, of an α,β-unsaturated dicarboxylic acid anhydride which is mono-esterified from 50 to 120 mole percent with an alkylene oxide mono ether primary or secondary alcohol having the general formula:

$$R(OC_nH_{2n})_mOH$$

wherein $n$ is an integer from 2 to 4 inclusive, $m$ is an integer from 3 to 40, and R represents alkyl radicals containing from 1 to 21 carbon atoms, cycloalkyl, mononuclear aromatic radicals, $C_1$ to $C_{10}$ substituted aromatic radicals or a $C_3$ or $C_4$ unsaturated aliphatic primary or secondary alcohol having the —C=C— group at least one carbon removed from the OH, and (B) an epoxide having an epoxide equivalent weight of from 44 to 1000, preferably from 70 to 700, in a ratio to the vinyl aromatic copolymer such that the epoxide to anhydride, including COOH, ratio is from 0.2 to 2.5, preferably from 0.5 to 2.0. It is preferred that the thermosetting composition contain at least 50 parts by weight of the vinyl aromatic copolymer which preferably contains at least 30 weight percent of the vinyl aromatic monomer. The vinyl aromatic polymer should have a molecular weight characterized by 10% solution viscosity in methyl ethyl ketone at 25° C. of 0.5 to 20 cps., preferably 0.9 to 10 cps.

Most of the properties of the laminates and coatings obtained from these compositions are retained when minor amounts of other polymerizable monomers snuch as alkyl acrylates and methacrylates, dialkyl fumarates, acrylonitrile, methacrylonitrile, or mixtures thereof are employed therein. When substantial proportions of these monomers, particularly acrylates and methacrylates, are included in the terpolymer the resulting coatings tend to lose their solvent and stain resistant properties. When employed in laminate structures the surface hardness of the laminates is decreased by the plasticizing action of such monomers as alkyl acrylates.

Vinylidene compounds which are suitable include, for example, styrene, vinyl toluene, t-butyl styrene, mono- and dichlorostyrene, α-methyl styrene, mixtures thereof and the like.

α,β-Unsaturated dicarboxylic anhydrides which are suitable for preparing the partial esters include, for example, maleic anhydride, chloromaleic anhydride, citraconic anhydride, itaconic anhydride, aconitic anhydride and the like.

The ether alcohols employed may have an average molecular weight of from 200 to 2,500, preferably from 300 to 1,000. Examples of such alkylene oxide mono ether alcohols are listed in the following table, which is not to be construed as limiting in any manner. The physical properties of the half esters prepared by reacting stoichiometric amounts of these alcohols with maleic anhydride in a closed container at 60° C. with occasional shaking are also given. Advantageously, an esterification of from 50 to 120 mole percent, preferably 50 to 100 mole percent, where 100 mole percent would represent maleic acid mono ester and 200 mole percent the diester, is employed.

TABLE I

| Run | Alcohol* | Formula Wt. of Maleic Half Ester | OH Eq. Wt. of Maleic Half Ester | $n_D^{25}$, °C. |
|---|---|---|---|---|
| 1 | Polyglycol 34 $(CH_3CH_2CH)_2\text{—}C_6H_3(OC_2H_4)_{10}OH$ 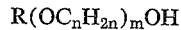 $CH_3$ | 744 | 948.1 | 1.4910 |
| 2 | Polyglycol 89-1 $(CH_3CH_2CH)_2\text{—}C_6H_3(OC_2H_4)_{40}OH$ \| $CH_3$ | 2,064 | 2,122.1 | 1.4797 |
| 3 | Dowanol TMH $CH_3(OC_2H_4)_3OH$ | 262.25 | 265.6 | 1.4722 |
| 4 | Dowanol TEH $C_2H_5(OC_2H_4)_3OH$ | 276.28 | 298.1 | 1.4695 |
| 5 | Dowanol TBH $C_4H_9(OC_2H_4)_3OH$ | 304.33 | 338.1 | 1.4653 |
| 6 | Polyglycol E 300 n-Butyl Ether $C_4H_9(OC_2H_4)_5OH$ | 398.1 | 455.1 | 1.4685 |
| 7 | Polyglycol E 338 n-Butyl Ether $C_4H_9(OC_2H_4)_6OH$ | 436.1 | 452.1 | 1.4670 |
| 8 | Polyglycol E 600 Methyl Ether $CH_3(OC_2H_4)_{13}OH$ | 698.1 | 705.1 | 1.4695 |
| 9 | Polyglycol E 394 iso-Octyl Ether $C_8H_{17}(OC_2H_4)_6OH$ | 492.1 | 489.1 | 1.4670 |
| 10 | Polyglycol E 600 iso-Octyl Ether $C_8H_{17}(OC_2H_4)_{11}OH$ | 698.1 | 676.1 | 1.4677 |
| 11 | Polyglycol 59-13 iso-$C_{13}H_{17}(OC_2H_4)_9OH$ | 695.1 | 810.1 | 1.4675 |
| 12 | Dowanol TPM $CH_3(OCH_2CH)_3OH$ \| $CH_3$ | 304.4 | 302.1 | 1.4574 |

TABLE I—Continued

| Run | Alcohol* | Formula Wt. of Maleic Half Ester | OH Eq. Wt. of Maleic Half Ester | $n_D^{25}$, °C. |
|---|---|---|---|---|
| 13 | Polyglycol P 600 Methyl Ether<br>$CH_3(OCH_2CH)_{10}OH$<br>$\quad\quad\quad\quad\mid$<br>$\quad\quad\quad\quad CH_3$ | 698.1 | 671.1 | 1.4543 |
| 14 | Polyglycol P 600 iso-Octyl Ether<br>$C_8H_{17}(OCH_2CH)OH$<br>$\quad\quad\quad\quad\mid$<br>$\quad\quad\quad\quad CH_3$ | 698.1 | 666.1 | 1.4547 |
| 15 | Polyglycol E-200 n-Butyl Ether<br>$C_4H_9(OC_2H_4)_4OH$ | 298.1 | 328 | 1.4650 |
| 16 | Dowfax 9N9<br>$C_9H_{19}$⟨⟩$(OC_2H_4)_{11}OH$ | 803.0 | 814 | 1.4940 |

*Structures are given for the average value of the molecular weight, ignoring the molecular weight distribution which is normally quite broad for unrefined glycol mono ether.

These half esters are generally soluble in acetone, alcohol, 1% caustic and xylene. They are generally insoluble in kerosene and of slight solubility in water except for the higher ethylene oxide containing glycol mono ether half esters.

Half ester copolymers useful in the present invention are preferably prepared from the vinyl aromatic monomer and acid maleate by solution polymerization, although bulk, emulsion or suspension polymerization methods may also be employed. Two requirements of the polymerization method are (1) that it results in substantially uniform copolymer composition, and (2) that the copolymer be essentially uncrosslinked.

The solution copolymerization is preferably carried out in an aromatic solvent such as xylene, toluene, and the like or in a ketone such as methyl ethyl ketone (MEK), methyl isobutyl ketone, etc. In order to achieve adequate copolymer composition homogeneity it is best to add the acid maleate monomer admixed with the polymerization catalyst to a solution of the vinyl aromatic monomer over a period of time corresponding to about 80% conversion of the monomers to the copolymer. Solution copolymerization with relatively large amounts of free radical catalysts is usually adequate for preparation of uncrosslinked products. Solution or bulk copolymerization as in copending application S.N. 33,376, filed June 2, 1960, by a continuous method of feeding the reactants to a well-stirred reactor and continuous removal of a monomer-polymer solution gives the desired uniform polymer compositions. The copolymer may be isolated by precipitation in a non-solvent or by devolatilization in some cases.

Where cross-linking is a problem, lower polymerization temperatures or higher solvent concentrations will usually prevent gelation. An alternate route, however, is to react a corresponding homogeneous maleic anhydride copolymer such as is described in copending application S.N. 33,376, filed June 2, 1960, with the polyalkylene oxide mono ether. This reaction is advantageously carried out in an aromatic or ketonic solvent or solvent blend at about 60° C. and may be speeded by addition of a small amount of an acid catalyst such as p-toluene sulfonic acid or dry HCl.

While the invention is applicable to epoxides generally, preferred polyepoxides are glycidyl polyethers of aromatic polyhydric compounds having weight per epoxide group of 110 to 700. Glycidyl ethers of polyhydric alcohols are also well known. These polyepoxides are made by reacting at least about two moles of an epihalohydrin with one mole of a polyhydric alcohol such as ethylene glycol, pentaerythritol, etc., followed by dehydrohalogenation according to U.S. Patent 2,581,464.

In addition to polyepoxides made from alcohols or phenols and an epihalohydrin, polyepoxides made by the known peracid method are also suitable. Epoxides of unsaturated esters, polyesters, diolefins, and the like can be prepared by reacting the unsaturated compound with a peracid. The reaction is one of epoxidation of compounds with isolated double bonds, at a temperature sufficiently low so that the acid resulting from the peracid, for example, acetic acid in the case of peracidic acid, does not react with the resulting epoxide group to form hydroxyl groups and ester linkages. Preparation of polyepoxides by the peracid method is described in various periodicals and patents and such compounds as butadiene, polybutadiene, ethyl linoleate, as well as di- or tri-unsaturated drying oils or drying oil acids, esters and polyesters can all be converted to polyepoxides.

Epoxidized drying oils are also well known, these polyepoxides usually being prepared by reaction of a peracid such as peracetic acid or performic acid with the unsaturated drying oil according to U.S. Patent 2,569,502.

Desirable esters for epoxidation are prepared by reacting unsaturated aldehydes with butadiene to form unsaturated cyclic aldehydes. These can be condensed by the Tischenko reaction to form esters or reduced to form alcohols which can be subsequently reacted with acids to form esters.

In addition to epoxidized drying oils, butadiene dioxide and monomeric esters, polymeric esters can also be epoxidized by the peracid method as described in Australian Patent 11,862, 1955. Examples of these unsaturated polyesters are those made from unsaturated polyhydric alcohols and unsaturated poly-basic acids, for example, maleic acid, 2-butenediolic acid, 4-cyclohexane-1,2-dicarboxylic acid, dimerized linoleic acid, etc., and such alcohols as ethylene glycol, 1,6-hexanediol, 3-ethylhexanediol-1,3-pentaerythritol, etc. Other polyesters which can be epoxidized with peracetic or other peracids are made from saturated acids and unsaturated alcohols, for example, 2-butenediol-1,4, 1,5-hexanediene-3,4-diol, 2-pentene-1,5-diol, cyclohexendiol-2,5, etc., reacted with saturated acids or acid anhydrides as malonic succinic, glutaric, terephthalic, etc.

Examples of such polyepoxides include diglycidyl ether, the diglycidyl ether of diethylene glycol or dipropylene glycol, the diglycidyl ether of polypropylene glycols having molecular weights up to, for example, about 2,000, the triglycidyl ether of glycerine, bisphenolic epoxies, the diglycidyl ether of resorcinol, epoxy novolacs, glycidyl ethers of Cashew nut oil, epoxidized soybean oil, epoxidized unsaturated polyesters, vinyl cyclohexene dioxide, dicyclopentadiene dioxide, dipentene dioxide, epoxidized polybutadiene and epoxidized aldehyde condensates such as 3,4-epoxy-6-methylcyclohexylmethyl-3,4-epoxymethylcyclohexane carboxylate.

Commercial epoxy resins employed in the compositions of the present invention were DER 332 diglycidyl ether of bisphenol A; 812 (a product of the Shell Chemical Company having an epoxide equivalent weight of 140–165, an average molecular weight of 300 and a viscosity at 25° C. of 150–210 cps.); the diglycidyl ether of a polypropylene glycol having an average molecular weight of about 400 and an epoxide equivalent weight of about 355 (herein designated as Epoxy 355); 3,4-epoxy-6-methylcyclohexylmethyl - 3,4-epoxy-6-methylcyclohexane carboxylate (Unox 201); Oxirane 2001 (a product of Food Machinery Corporation having an epoxide equivalent weight of 145 and an iodine number of 154); Epoxol 7–4 (an epoxidized soybean oil produced by Swift and Company and having an epoxide equivalent weight of 240 with an average of 4 epoxide groups per molecule); Cardolite NC 513 (an epoxidized Cashew nut oil produced by Minnesota Mining and Manufacturing Company and having an epoxide equivalent weight of 475–575); DEN 438 (an epoxy novolac having a molecular weight of 600 and an epoxide equivalent weight of 176; and X2633.8 epoxidized Bisphenol A having an epoxide equivalent weight of 298.

Monoepoxides which are preferred include polyfunctional compounds which have a reactive group such as —C=C—, OH, or acetate in addition to the epoxide group. Examples of such compounds are 2,3-epoxy-2-ethyl hexanol; allyl-9,10-epoxystearate; and 3,4-epoxy-6-methylcyclohexylmethyl acetate. Simple monoepoxides such as styrene oxide and the alkylene oxides are also operative, although the degree of cross-linking obtained in the thermosetting reaction is generally lower and volatility may be a problem in some applications. In general when these monoepoxides are used the $\alpha,\beta$-unsaturated dicarboxylic anhydride should be less than 100% mono-esterfied because of the higher cross-linking efficiency of the anhydride groups.

Curing catalysts such as tertiary amines or amine salts, quaternary amine bases or salts, or inorganic bases may be used, if desired, to shorten the curing time.

The compositions of the present invention may include other additives, such as plasticizers, fillers, pigments and the like. If desired, reactive agents such as epoxy, hydroxy, carboxy, anhydride, and mercapto-containing agents may be employed to obtain desired effects. Examples of such agents include polyesters made from phthalic or adipic acid and ethyleneglycol or glycerine; anhydrides such as dodecyl succinic anhydride and trimellitic anhydride, fatty acid mono- or diglycerides; and liquid mercaptan terminated polysulfide polymers. Non-reactive plasticizers and additives such as n-butyl stearate, dioctyl diphenyl oxide, tris butyl phenyl phosphate; glass, cellulosic or synthetic fibers; metal filings, pigments, and inorganic fillers may be added as desired.

Coating and laminate applications normally employ organic solvent solutions of the copolymer-epoxy compositions. The solvent or solvent blend employed is chosen to provide the desired volatility, rheology, sprayability or other properties.

Solvents which are suitable include aromatic hydrocarbons such as toluene and xylene, ketones such as methyl ethyl ketone, methyl isobutyl ketone, diacetone alcohol, and mesitylene oxide, high solvency naphthas, mineral spirits and alcohols, although mineral spirits usually have to be employed in admixture with another solvent. When alcohols are employed their reactivity with anhydride which may remain in the polymer and the possibility of transesterification with the glycol mono ether half ester must be considered.

Inasmuch as aromatic hydrocarbons provide the most economic solvents for the resins of this invention, a particular advantage is gained by using less than 20 mole percent of maleic anhydride partial ester in the vinyl copolymer. With greater amounts than this, solvent blends are usually required to dissolve the resin and higher viscosity solutions generally result. In addition, at higher maleic content the amount of epoxy resin required to react with the carboxyl groups becomes greater and can lead to over-crosslinking as well as economic disadvantages.

The epoxy used to cure or thermoset the vinyl copolymer resin also imparts improved adhesion to a substrate such as glass, metal, wood, etc. This allows even very hard thermoset compositions to exhibit good impact resistance and flexibility in that although crazing may occur, a coating, for example, will still adhere. Flexibility may be modified by using acrylates in a terpolymer as noted above, by incorporating plasticizing additives or by choosing a flexible type epoxy or a mixture thereof with a harder type epoxy.

The thermosetting composition may be cured over the temperature range of from about 20° C. up to about 400° C. At room temperature, the cure may require several months, although catalysts can shorten this to a few days. At elevated temperatures such as exposure to a flame, the cure may be accomplished in less than a minute. Preferred baking temperatures are generally 100 to 200° C. for times of 2 hours to about 10 minutes. The main test of *cure* is the performance of the cured composition. For example, in coatings optimum hardness, adhesion, solvent resistance and impact resistance are gained only with adequate cure, which means in general reaction of epoxy groups with carboxyl groups.

A particular feature of the invention is the provision of water-based coating vehicles. Surprisingly, the aqueous solutions or dispersions obtained by the methods of this invention can be formulated with even water insoluble epoxies. These formulations when stirred to homogeneity will cast to compatible coating films. In some cases the epoxy will separate to a separate layer on standing, but it can be redispersed by simply stirring. The air dry coating which results is clear, and upon baking the adhesion, impact, flexibility, solvent resistance and water resistance properties are found to be comparable to solvent cast films. When such water based coatings are employed it is preferred to employ glycol mono ethers of the formula $$R(OC_2H_4)_mOH$$

wherein $m$ is an integer from 4 to 8. The $\alpha,\beta$-unsaturated dicarboxylic acid is preferably esterified to from 50 to 80%, and the vinyl aromatic copolymer preferably contains from 10 to 30 mole percent of the half ester when water-based coatings are desired.

*Example 1*

A sample of polyethylene oxide mono-n-butyl ether with a calculated average molecular weight of 338 was obtained from the base-catalyzed reaction of ethylene oxide with n-butanol. A hydroxyl analysis given an OH equivalent weight of 354, indicating an average of about 6 ethylene oxide units. To 1333 g. of the glycol mono ether was added 369 g. of maleic anhydride and the mixture was heated at 60° C. for 3 weeks. The product had the following properties: $n_D^{25}$ 1.4670; $d^{25}$ 1.1208;

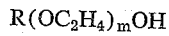

It was soluble in acetone, ETOH, 1% NaOH, H₂O, and xylene and insoluble in kerosene.

A 1 liter flash charged with 171.9 g. styrene and 128 g. of xylene was heated to reflux at 140° C. under a nitrogen blanket and a solution of 153.1 g. of the above-prepared E338 butyl acid maleate in 47.0 g. xylene containing 3.3 g. of di-t-butyl peroxide was added continuously over 19 minutes from a dropping funnel with stirring of the polymerizing mixture. Heating was continued 4 hours more and the product was removed and tested. By devolatilizing a small portion at 120° C. for 1 hour the percent solids was 63.3. This devolatilized polymer was dissolved in methyl ethyl ketone to form a 10% solids solution which had an absolute viscosity at 25° C. of 2.24 cps. From infrared analysis of a cast film, it was determined that the maleic anhydride was about 75% monoesterified.

To 315 g. of the copolymer solution in xylene was added 657.5 g. of water and 22 cc. of concentrated (28%) ammonium hydroxide in a flask fitted for efficient stirring and distillation. Using a nitrogen stream bubbling through the mixture to suppress foaming, there was distilled 124 cc. of water and 133 cc. of xylene. The resulting mixture was stablized by addition of 89.5 g. of n-propanol, yielding an opaque, relatively viscous dispersion containing 25% solids at a pH of about 7.5.

Coating formulations were prepared from 10 g. portions of this aqueous polymer dispersion and a variety of epoxies in an epoxide to anhydride plus COOH ratio of 1:1 as follows:

| Run | Epoxy Compound | Epoxy, Eq. Wt. | Wt. Epoxy/ 10 g. Resin Dispersion |
|---|---|---|---|
| 1 | 2,3-epoxy-2-ethylhexanol | 144 | 0.382 |
| 2 | Allyl-9,10-epoxy stearate | 338 | 0.895 |
| 3 | 3,4-epoxy-6-methyl-cyclohexyl Mi acetate. | 184 | 0.487 |
| 4 | Styrene oxide | 121 | 0.320 |
| 5 | Cardolite NC 513 | 537 | 1.40 |
| 6 | Unox 201 | 140 | 0.365 |
| 7 | DER 332 | 174 | 0.453 |
| 8 | Diethylene glycol-diglycidyl ether. | 109 | 0.284 |
| 9 | Oxirane 2001 | 232 | 0.284 |
| 10 | Epoxol 7-4 | 240 | 0.625 |

After stirring in the epoxy, the mixtures were cast on Bonderite 1000 (Parker Rustproof Co.) 25 mil steel test panels with a No. 42 spiral wound Maier casting rod from R.D. Specialties, Webster, New York. Upon air drying, the films (0.7 to 1.3 mils) were continuous, clear and generally non-tacky. After baking at 150° C. for 1 hour the films possessed excellent acetone and impact resistance (30 in. lb. front side). They had good resistance to steam, (10 p.s.i), and marring and good to excellent resistance to crazing.

*Example 2*

Using essentially the procedure of Example 1, PG 59–13, PG 89–1 and Dowanol TPM methyl ether were reacted with maleic anhydride to produce half esters containing 0.84, 0.97 and 1.0 moles of the alcohol per mole of maleic anhydride respectively. The resulting acid maleates were polymerized with styrene in xylene solution as follows:

| Run | Acid Maleate | Mole Percent | Addition Time | Catalyst | Final Percent Solids | Viscosity MEK | Conversion, Percent |
|---|---|---|---|---|---|---|---|
| 1 | PG 59-13 | 12 | 60 | Benzoyl Peroxide | 63.8 | 0.95 | 98.2 |
| 2 | PG 89-1 | 12 | 60 | do | 62.6 | 0.97 | 96.3 |
| 3 | Dowanol TPM | 17 | 134 | TBHP/DTBP[1] | 58.2 | 1.46 | 89.5 |
| 4 | do | 22 | 138 | TBHP/DTBP[1] | 54.9 | 2.85 | 84.7 |
| 5 | do | 27 | 173 | TBHP/DTBP[1] | 57.8 | 1.96 | 98.0 |

[1] TBHP/DTBP=t-butyl hydroperoxide and ditertiary butyl peroxide.

Samples from Runs 3, 4, and 5 were neutralized with ammonium hydroxide, diluted with water to 35.2, 24.0 and 20.5 percent solids, respectively, and formulated with Cardolite-NC 513, at an epoxy to anhydride plus COOH ratio of 0.25, and with 2 g. of a pigment formulation containing 760 g. water, 48 g. Tamol 731 (25%), 18 g. polyglycol P1200, 900 g. red iron oxide and 2100 g. barytes, per 10 g. of polymer solution. Coatings on Bonderite 1000 were baked 1 hour at 160° C. They had good knife adhesion and were resistant to crazing (¼" mandrel bend), steam, acetone and impact. They were of good hardness.

Similarly neutralized xylene-containing aqueous solutions of the above styrene-half ester polymers were steam distilled to remove the xylene resulting in pH values of 5.6, 5.5, 7.4, and 7.8 and percent solids of 30.21, 28.8, 21.8, and 22.4 for Runs 1, 2, 4 and 5 respectively. The products were formulated with Cardolite-NC 513 and DER 332 epoxy resin as shown in the following table. Films were cast on Bonderite 1000, and baked at 150° C. for 1 hour.

TABLE II

| Sample From Run— | Epoxy Cpd. | Wt. Epoxy/ 10 g. solution | Epoxy/ Anhydride+ COOH | Film Thickness | Reverse Impact, In.-Lb. |
|---|---|---|---|---|---|
| 1 | Cardolite | 1.11 | 1.0 | 1.5 | 90 |
| 1 | DER 332 | 0.36 | 1.0 | 1.0 | 90 |
| 2 | Cardolite | 0.578 | 1.0 | 0.5 | 90 |
| 2 | DER 332 | 0.168 | 1.0 | 0.7 | 90 |
| 4 | Cardolite | 0.875 | 0.5 | 1.4 | 90 |
| 4 | do | 1.32 | 0.75 | 1.5 | 90 |
| 4 | do | 1.74 | 1.0 | 1.5 | 90 |
| 4 | do | 2.18 | 1.25 | 1.5 | 90 |
| 4 | do | 2.87 | 1.67 | 1.5 | 90 |
| 5 | do | 2.06 | 1.0 | 1.0 | 90 |

*Example 3*

Following the procedure of Example 1 the following mono esters were polymerized with styrene in xylene solution employing 0.375 weight percent of di-t-butyl peroxide and t-butyl hydroxide (based on monomer) as catalyst.

TABLE III

| Run | Acid Maleate | Mole Percent Maleic | Additive Time, Min. | Final Solids | MEK Viscosity | Conversion, Percent | Infrared Percent Acid Maleate |
|---|---|---|---|---|---|---|---|
| 1 | Dowfax 9N9 | 11.3 | 60 | 60 | 1.53 | 100 | 70 |
| 2 | Dowfax 9N9 | 4.1 | 60 | 59.0 | 1.81 | 98.5 | 70 |
| 3 | E200Bu | 17.0 | [1] 190 | 58.2 | 2.00 | 97.0 | 80 |
| 4 | E338Bu | 12.8 | 60 | 51.3 | 1.89 | 85.7 | 80 |
| 5 | E338Bu | 7.4 | 60 | 57.3 | 1.89 | 95.6 | 75 |
| 6 | E338Bu | 21.2 | 60 | 57.7 | 1.40 | 96.2 | 80 |
| 7[2] | 0.5E338Bu | 17.0 | 60 | 69.9 | 2.57 | 99.9 | 50 |
| 8[2] | 0.7E338Bu | 17.0 | 60 | 72.6 | 1.75 | 100 | 70 |
| 9[2] | 0.9E338Bu | 17.0 | 60 | 72.0 | 1.53 | 100 | 90 |

[1] 1/5 of monomer feed added at start.
[2] Solvent was Dowanol EB.

The resulting polymers were formulated with DER 332 epoxy resin in an epoxide to anhydride plus COOH ratio of 1:1 as shown in Table IV, cast on *10 mil tin plate* panels and baked for 1 hour at 150° C. The resulting films did not swell or peel, had good craze and mar resistance, and passed reverse impact tests of up to 90 in.-lbs.

TABLE IV

| Run | Gr. DER 332 epoxy resin per 10 g. resin solids | Percent DMP 30 | Thickness |
| --- | --- | --- | --- |
| 1 | 1.06 | | 1.0 |
| 2 | 0.528 | 0.3 | 1.5 |
| 3 | 2.06 | 0.3 | 1.6 |
| 4 | 1.51 | | 1.4 |
| 5 | 0.97 | | 1.1 |
| 6 | 2.08 | | 1.0 |
| 7 | 1.096 | 0.3 | 1.5 |
| 8 | 1.412 | 0.3 | 1.6 |
| 9 | 1.686 | 0.3 | 1.7 |

*Example 4*

141.4 g. of E-394 x-octyl monoether and 391.4 g. of xylene were added to 250 g. of styrene-maleic anhydride copolymer having a viscosity (10 percent in MEK) of 3.94 cps. prepared as in copending application S.N. 33,376, filed June 2, 1960. After the polymer was dissolved the solution was heated at 40° C. for 58 days. Infrared analysis of a cast film indicated 75 percent conversion of the anhydride to monoester.

The resulting polymer was formulated with the epoxy resins indicated below at an epoxy to anhydride plus COOH ratio of 1:1.

| Run | Epoxy Resin | Eq. Wt. | Grams Per 10 Gr. Epoxy Resin Solids | Percent DMP 30[1] | Clarity | Thickness | Reverse Impact Passed (in.-lb.) |
| --- | --- | --- | --- | --- | --- | --- | --- |
| 1 | DER 332 | 174 | 1.586 | 0.3 | Clear | 1.6 | 90 |
| 2 | DER 332 | 174 | 1.586 | | Clear | 1.5 | 90 |
| 3 | DER 661 | 525 | 4.84 | 0.3 | Clear | 2.0 | 90 |
| 4 | DER 661 | 525 | 4.84 | | Clear | 1.8 | 90 |

[1] DMP 30 is tri(dimethylaminomethyl) phenol.

The films had excellent craze resistance and did not peel in xylene.

*Example 5*

Following the procedure of Example 1 a copolymer of vinyl toluene and the maleic half ester of Dowanol TPM methyl ether (11.5 mole percent) was prepared using a mixture of di-t-butyl peroxide and t-butyl hydroperoxide as catalyst. The resulting polymer was formulated with DER 332 epoxy resin at an epoxide to anhydride plus COOH ratio of 1:1, a 1.3 mil thick film was cast on 10 mil tin plate and baked 1 hour at 150° C. The film had excellent mar resistance, and did not swell, peel or mar in xylene.

A similar product prepared using dichlorostyrene in place of the vinyl toluene and containing 17.0 mole percent of the half ester passed a reverse impact test of 90 in.-lbs.

*Example 6*

Following the procedure of Example 1 a copolymer of styrene and the maleic half ester of Dowanol TPM methyl ether (25.0 mole percent) was prepared in xylene. There were then added 14.7 parts of DER 332 epoxy resin per hundred parts of copolymer and 0.5 weight percent, based on total solids, DMP 30 solids. The resulting mixture was thinned to 40% solids with acetone.

Glass cloth (weave style 181 with Volan A finish) was saturated with this solution by repeated dipping. After air drying for 24 hours the weight ratio of glass to resin was 49/51.

Twelve plys of the treated cloth were stacked in a flat press at 300° F.; after 1 minute at 25 p.s.i. the pressure was raised to 300 p.s.i. for 29 minutes. The laminate was removed hot. It was hard, strong and structurally sound.

What is claimed is:

1. A compatible thermosetting resin composition comprising (A) a homogeneous copolymer of from 70 to 98 mole percent of a vinyl aromatic compound and from 30 to 2 mole percent of a partial ester of an $\alpha,\beta$-unsaturated dicarboxylic acid with an alkylene oxide monoether alcohol having the formula $$R(OC_nH_{2n})_mOH$$

wherein $n$ is an integer from 2 to 4 inclusive, $m$ is an integer from 3 to 40 and R is a member of the group consisting of primary and secondary alkyl radicals containing from 1 to 21 carbon atoms, cycloalkyl mononuclear aromatic radicals, and alkyl substituted mononuclear aromatic radicals containing from 1 to 10 carbon atoms in the alkyl groups and $C_3$ to $C_4$ unsaturated aliphatic primary and secondary alcohols in which the —C=C— is at least 1 carbon removed from the OH group, and (B) a polyepoxide having an epoxy equivalent weight of from about 44 to about 1000.

2. Composition of claim 1 wherein the composition contains at least 50 weight percent of the vinyl aromatic copolymer.

3. Composition of claim 2 wherein the vinyl aromatic copolymer contains at least 30 weight percent of the vinyl aromatic monomer.

4. Composition of claim 3 wherein the ratio of epoxide to partial ester is from 0.2 to 2.5.

5. Composition of claim 4 wherein the vinyl aromatic copolymer contains from 4 to 20 mole percent of said partial ester.

6. Composition of claim 5 wherein said partial ester contains from 50 to 120 mole percent of ester groups.

7. Composition of claim 6 wherein the polyepoxide equivalent weight is from 110 to 700.

8. Composition of claim 1 wherein the $\alpha,\beta$-unsaturated dicarboxylic acid is maleic acid.

9. Composition of claim 8 wherein the vinyl aromatic compound is styrene.

10. Composition of claim 8 wherein said partial ester is of maleic acid partially esterified with tripropylene glycol methyl ether.

11. Composition of claim 10 wherein the epoxy compound is the diglycidyl ether of p,p'-isopropylidenediphenol.

12. A method of coating an article comprising applying to a surface of the article the composition of claim 1 and thereafter curing said composition.

13. An article having on at least one surface a thin, tough, glossy, continuous and adherent protective baked-on coating consisting essentially of the composition of claim 1.

14. A laminate structure comprising at least two layers joined together by, and integrally bound with, a tough, adherent, cured adhesive consisting essentially of the composition of claim 1.

15. Composition of claim 1 wherein $m$ is an integer from 4 to 8.

16. Composition of claim 15 wherein said partial ester is monoesterified from 50 to 80%.

17. Composition of claim 16 wherein the vinyl aromatic copolymer contains from 10 to 30 mole percent of the half ester.

18. An aqueous dispersion of the composition of claim 16.

References Cited by the Examiner

UNITED STATES PATENTS

| 2,768,153 | 10/56 | Shokal | 260—47 |
| 2,938,887 | 5/60 | Weiss | 260—78.5 |
| 2,954,358 | 9/60 | Hurwitz | 260—24.6 |
| 3,002,860 | 10/61 | Bishop et al. | 260—837 |

MURRAY TILLMAN, *Primary Examiner.*

LEON J. BERCOVITZ, *Examiner.*

UNITED STATES PATENT OFFICE
CERTIFICATE OF CORRECTION

Patent No. 3,207,718

September 21, 1965

Robert L. Zimmerman et al.

It is hereby certified that error appears in the above numbered patent requiring correction and that the said Letters Patent should read as corrected below.

Column 2, line 9, for "snuch" read -- such --; column 3, line 66, for "weight" read -- weights --; column 4, line 51, for "2-butenediolic" read -- 2-butenedioic --; line 75, after "A;" insert -- Epon --; column 6, line 52, for "given" read -- gave --; column 8, line 62, for "hydroxide" read -- hydroperoxide --.

Signed and sealed this 20th day of September 1966.

(SEAL)
Attest:

ERNEST W. SWIDER
Attesting Officer

EDWARD J. BRENNER
Commissioner of Patents